US009487170B2

(12) United States Patent
Evans

(10) Patent No.: US 9,487,170 B2
(45) Date of Patent: Nov. 8, 2016

(54) TRUCK BUMPER SHELL AND METHOD OF RETROFIT INSTALLATION

(71) Applicant: Darin Evans, Newcastle, CA (US)

(72) Inventor: Darin Evans, Newcastle, CA (US)

(*) Notice: Subject to any disclaimer, the term of this patent is extended or adjusted under 35 U.S.C. 154(b) by 0 days.

(21) Appl. No.: 14/336,319

(22) Filed: Jul. 21, 2014

(65) Prior Publication Data

US 2015/0021942 A1    Jan. 22, 2015

Related U.S. Application Data

(60) Provisional application No. 61/856,882, filed on Jul. 22, 2013.

(51) Int. Cl.
*B60R 19/44* (2006.01)
*B29C 69/00* (2006.01)
*B60R 19/50* (2006.01)
*B29L 31/30* (2006.01)

(52) U.S. Cl.
CPC ............. *B60R 19/44* (2013.01); *B29C 69/001* (2013.01); *B60R 19/50* (2013.01); *B29C 2793/00* (2013.01); *B29C 2793/0009* (2013.01); *B29C 2793/009* (2013.01); *B29L 2031/3044* (2013.01); *B60R 2019/505* (2013.01); *Y10T 29/49732* (2015.01)

(58) Field of Classification Search
CPC . B60B 19/03; B60R 2019/505; B60R 19/44; B60R 13/00; B29C 2793/009
USPC ............ 293/123, 133, 117, 142, 102; 296/136.02, 187.02
See application file for complete search history.

(56) References Cited

U.S. PATENT DOCUMENTS

| | | | |
|---|---|---|---|
| 2,010,072 A | 8/1935 | Fergueson et al. | |
| 3,578,358 A | 5/1971 | Reynolds | |
| 3,841,682 A * | 10/1974 | Church | B60R 19/445 293/142 |
| 3,865,416 A | 2/1975 | Burg | |
| 4,225,167 A | 9/1980 | Buettner et al. | |
| 4,422,680 A | 12/1983 | Goupy | |
| 5,497,303 A * | 3/1996 | Decinti | B60Q 1/28 362/505 |
| 5,585,179 A * | 12/1996 | Nishiyama | B32B 7/04 428/317.3 |
| 5,620,218 A | 4/1997 | Saltzman et al. | |
| 6,139,044 A | 10/2000 | Smith et al. | |
| 6,149,181 A | 11/2000 | Biederman | |
| 6,644,699 B2 | 11/2003 | Anderson et al. | |
| 6,644,701 B2 | 11/2003 | Weissenborn et al. | |
| 6,672,635 B2 | 1/2004 | Weissenborn et al. | |
| 6,695,368 B1 | 2/2004 | Weykamp et al. | |
| 6,814,379 B2 | 11/2004 | Evans | |
| 7,303,219 B2 | 12/2007 | Trabant et al. | |
| 7,527,308 B2 * | 5/2009 | Buniewicz | B60R 19/04 280/164.1 |
| 7,552,955 B2 | 6/2009 | Evans | |
| 8,267,462 B2 * | 9/2012 | Bogdan | B60R 19/44 293/117 |
| 8,438,765 B2 * | 5/2013 | Sanders | B60R 13/10 40/200 |
| 2004/0217606 A1 | 11/2004 | Weykamp et al. | |
| 2008/0117080 A1 * | 5/2008 | Kudelko | B60Q 1/22 340/932.2 |

(Continued)

*Primary Examiner* — Pinel Romain
(74) *Attorney, Agent, or Firm* — Price Heneveld LLP

(57) ABSTRACT

A retrofitably-attachable pre-formed shell covers exposed steel areas of existing stamped chrome or painted truck bumpers, providing a unique re-useable decorative/protective plastic shell cover, the edges of which are tucked under the existing trim pieces of the bumper as a main attachment mechanism. The formed shells can be used to cover existing minor damage on the bumper. Light-passing images can be incorporated on the bumper shells, and backlit without changes to the bumper or deviation from the original surface profile of the bumper.

26 Claims, 11 Drawing Sheets

(56) References Cited

U.S. PATENT DOCUMENTS

2011/0198874 A1* 8/2011 Lee .................. B60R 19/44
    293/142

2015/0022994 A1* 1/2015 Bingle .................. G01D 13/20
    362/23.01

* cited by examiner

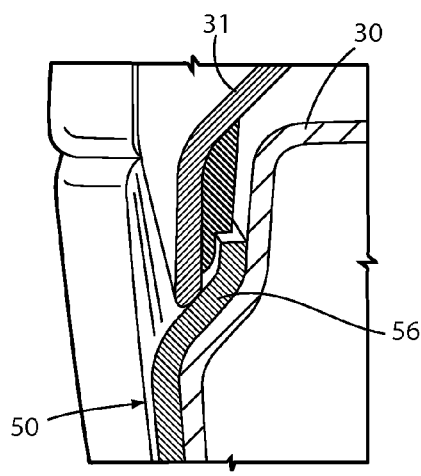
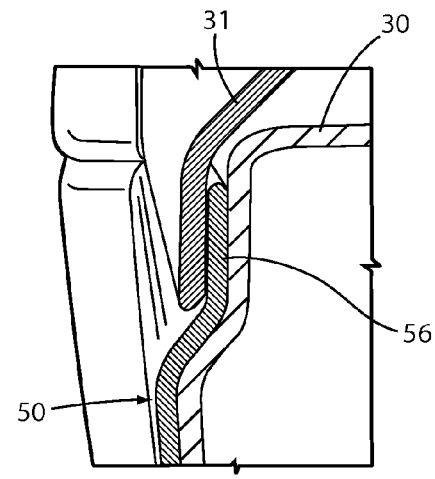
FIG. 6C    FIG. 6D
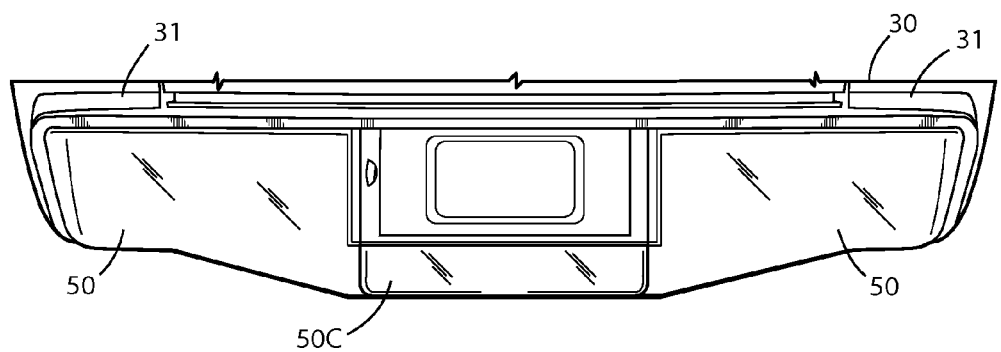
FIG. 6E
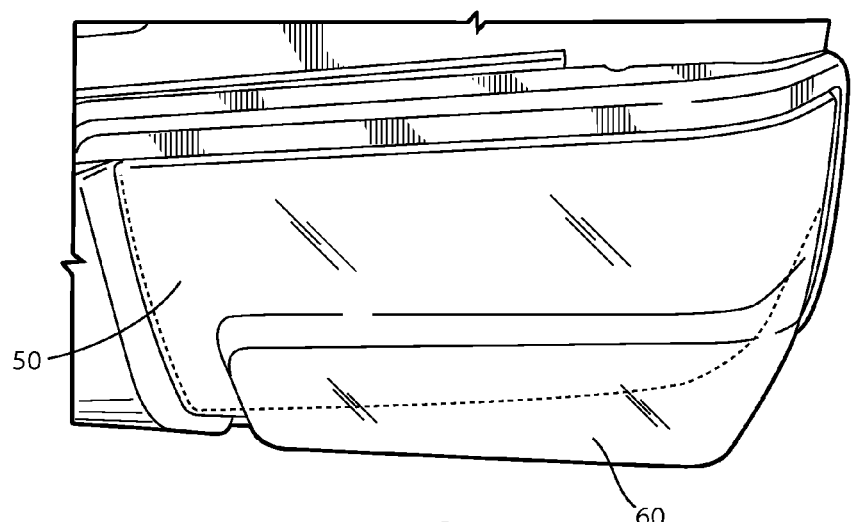
FIG. 7

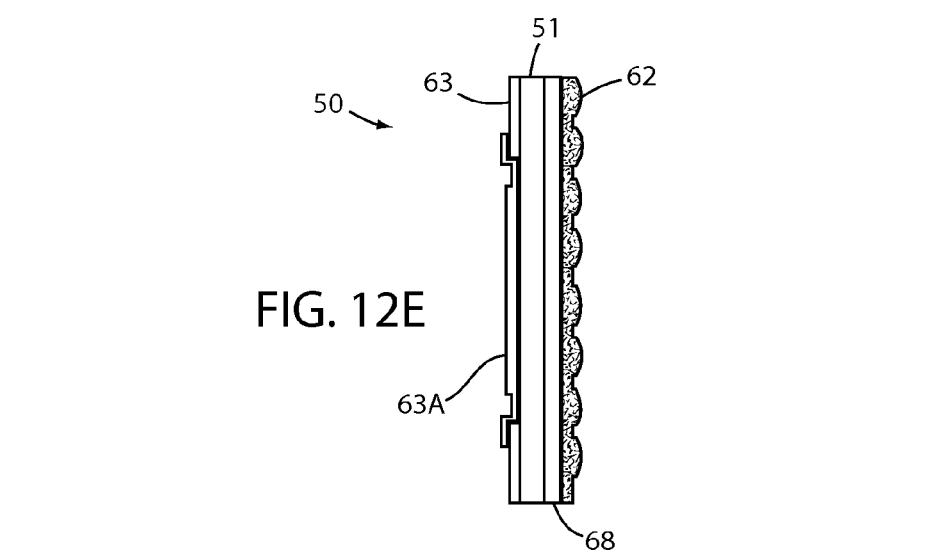
FIG. 12D
FIG. 12E
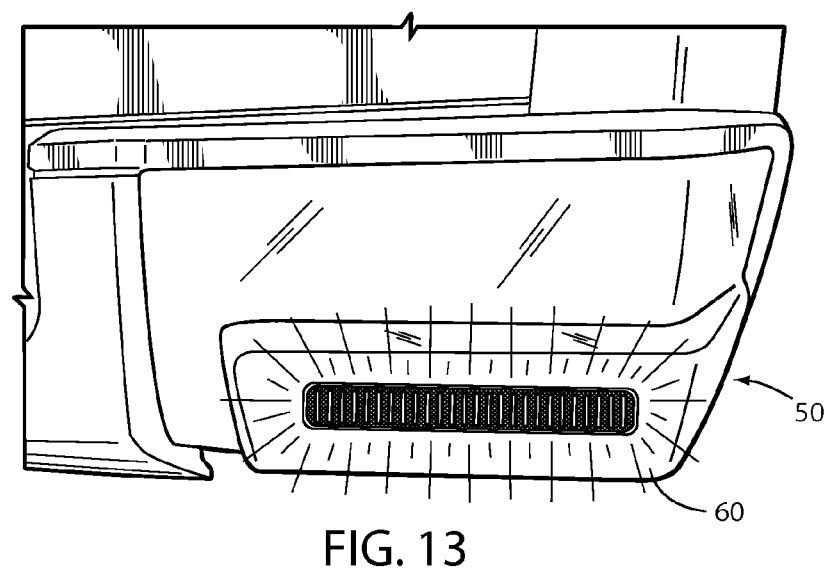
FIG. 13

TRUCK BUMPER SHELL AND METHOD OF RETROFIT INSTALLATION

This application claims benefit under 35 USC §119(e) of provisional application Ser. No. 61/856,882, filed Jul. 22, 2013, entitled TRUCK BUMPER SKIN SYSTEM AND METHOD OF REPAIR, the entire contents of which are incorporated herein in their entirety.

BACKGROUND OF THE INVENTION

The present invention relates to bumper shells and pre-formed thin-walled members used to cover vehicle bumpers (such as truck bumpers) having new or damaged show surfaces, and more particularly relates to a bumper covering system that adds value in terms of appearance, customizability, novelty and curb appeal; protects the bumper from minor damage, reduces repair expense, improves ease of repair; and that provides optional new lighting and visual effects.

Bumpers used on most body-on-chassis trucks have traditionally been stamped steel, either chromed or painted, serving both decorative/styling and impact protection functions. The manufacturing process of stamping steel and the fact the stamping needs to provide an impact function places many styling restraints on these types of bumpers. Additional molded plastic trim pieces that cover portions of the stamping are used to provide some styling differentiation or function, such as a step pad. These trim pieces are usually molded-in-color black and textured and attached to the bumper with integrated snap fits and clips (see FIG. 1).

Improvements are desired for several reasons. For example, bumpers quickly become worn or damaged, yet it is excessively expensive to have them repaired, such that truck owners do not get them repaired. This happens despite the fact that many truck owners are very proud of their trucks and want the truck to be a show piece (even after heavy use). Still further, many truck owners want to be able to customize their trucks, both to make the truck unique and customized to their personality, but also often to "make a statement" with their truck. However, existing bumper covering systems are generally too expensive to allow the truck owner to make the truck unique, since existing bumper covering systems must be created in volume in order to amortize tooling costs. The reader's attention is directed to the discussion of prior art bumpers illustrated in FIGS. 1-4 below.

SUMMARY OF THE INVENTION

In one aspect of the present invention, a bumper covering system is provided for covering a stamped vehicle bumper beam having a non-planar three-dimensional show surface. The system includes at least one thin-walled form-fit removable decorative shell shaped with an inner surface that mateably engages and generally matches the three-dimensional show surface of the existing vehicle bumper beam, the shell including an aesthetically treated outer surface covering the show surface and an attachment flange configured to engage existing trim on the vehicle bumper beam.

In a narrower form, a soft/tacky coating, such as a polyurethane material, can be added to an inner side of the shell to absorb minor impact and fill in defects in the metal bumper surface being covered.

In another aspect of the present invention, a bumper covering system comprises at least one form-fit decorative shell shaped with an inner surface that mateably engages and generally matches an original shape of a metal show surface of a vehicle bumper beam and that includes a light-passing portion and a light source behind the light-passing portion for lighting up the light-passing portion.

In another aspect of the present invention, a method of repair comprises attaching a pre-formed polymeric shell to a metal vehicle bumper beam to cover a damaged show surface of the vehicle bumper beam, the pre-formed polymeric shell having a non-planar three-dimensional internal surface that generally matches an original undamaged shape of the show surface and having sufficient rigidity to maintain a shape of the polymeric shell without full contact against the show surface of the metal vehicle bumper beam.

In another aspect of the present invention, a method of trimming a shell component includes using a vacuum-forming tool to form a vacuum-molded component that includes a functional shell and a raised shoulder area extending around a perimeter of the shell, the raised area being placed at a specific distance from a desired trim edge of the shell to thus form a guide around the shell. The method further includes cutting the shell from the component using a cutting tool that slideably engages the raised shoulder as an integral guide around the shell.

These and other aspects, objects, and features of the present invention will be understood and appreciated by those skilled in the art upon studying the following specification, claims, and appended drawings.

BRIEF DESCRIPTION OF THE DRAWINGS

FIGS. 6A-6D are two perspective views and two cross sectional views showing installation of the shell in FIG. 5 to a truck bumper beam in a bumper system, FIGS. 6C and 6D showing alternative integral attachment flange configurations.

FIG. 6E is a perspective view of a complete bumper beam and bumper system, with the present shell including first and second end shells and a center shell, each including edge-located integral attachment flanges and inboard tab inter-fit with each other and with the existing bumper system for secure retrofit attachment.

FIG. 7 is a perspective view of a modified shell (also called a "shell component") similar to FIG. 6B but modified to have a different outer surface profile.

FIGS. 11, 12A-12E and 13 are views of modified innovative shell coverings installed over the end of the bumper system in FIG. 10, each having a different light-passing portion therein, FIG. 11 showing a light-passing portion in the form of letters, FIGS. 12A-12B showing an unlit and lighted version of a light-passing portion with the window forming a duck head, FIG. 12C showing a vertical cross section through FIG. 12B including an electro luminescent (EL) film generating light for shining through the window, FIG. 12D showing a light-passing portion forming a trademarked brand or symbol, FIG. 12E showing a vertical cross section through FIG. 12D including showing a colored outer panel placed across the window on the shell, and FIG. 13 showing a grille-like light-passing portion forming a rear bumper light (or back-up light).

DESCRIPTION OF PRIOR ART

Figure 1:
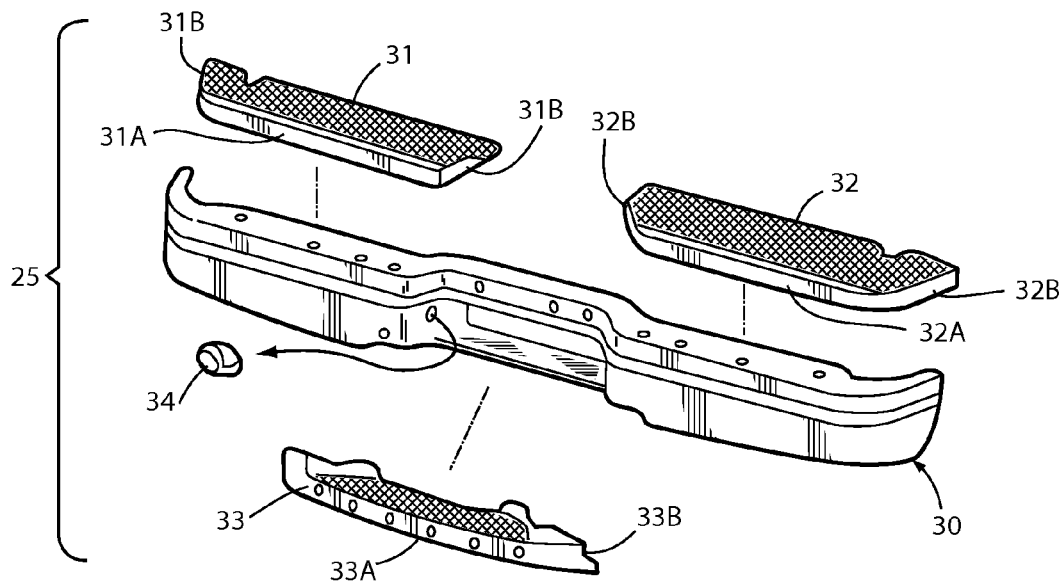
FIGS. 1-4 are perspective views illustrating various prior art bumper systems discussed below.

FIG. 1 illustrates a bumper system 25 in prior art where its stamped bumper beam (illustrated as beam 30) is limited to simple shapes. The exposed steel of the beam 30 is directly exposed to damage from impacts (minor and major), such as rock impingement, scratches, or low speed impacts/bumps/scuffs, as well as environmental damage such as corrosion. Because the mild steel used in stamping bumpers can be relatively easily formed in to a permanent shape, these minor impacts can lead to permanent dents and dings that cannot be easily repaired, thus requiring expensive full replacement. Attached to the illustrated beam 30 are "bumper-covering accessories" (also called "existing trim" herein), such as top end tread pieces 31 and 32 and center tread piece 33, and other components such as license plate light 34. Each of the illustrated trim 31-33 only cover a portion of the beam 30, and in particular include a horizontal section covering an associated top surface of the beam 30, and include downwardly-extending outer flanges 31A-33A, respectively, covering an upper horizontal edge of a vertical portion of the beam 30. The trim 31-33 (and other bumper covering components) are attached by many different means, such as mechanically and/or adheringly. As used herein, the term "trim" (and "tread pieces") is not intended to be unnecessarily limiting, and instead are intended to be interpreted as including various bumper covering components attached to a bumper beam to cover selected areas of the beam for aesthetics and/or function.

Figure 2:
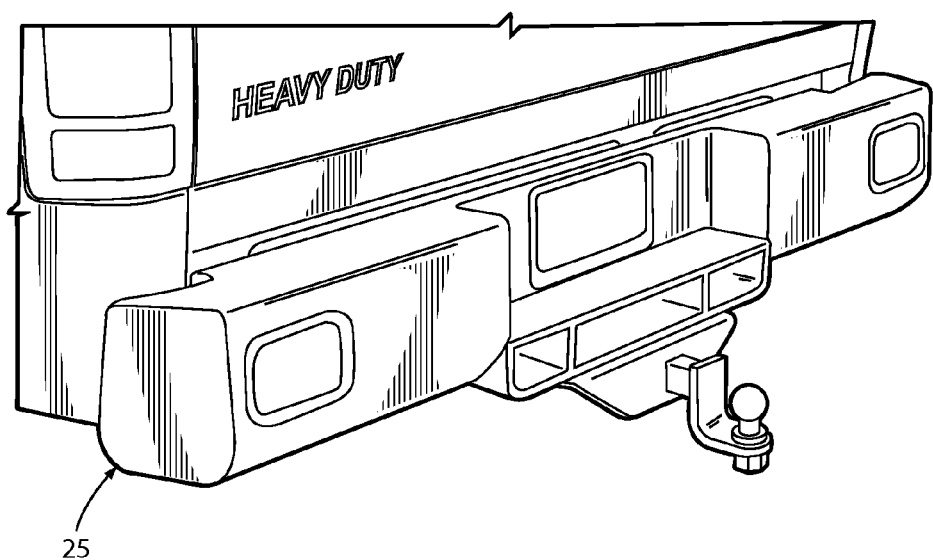
Figure 3:
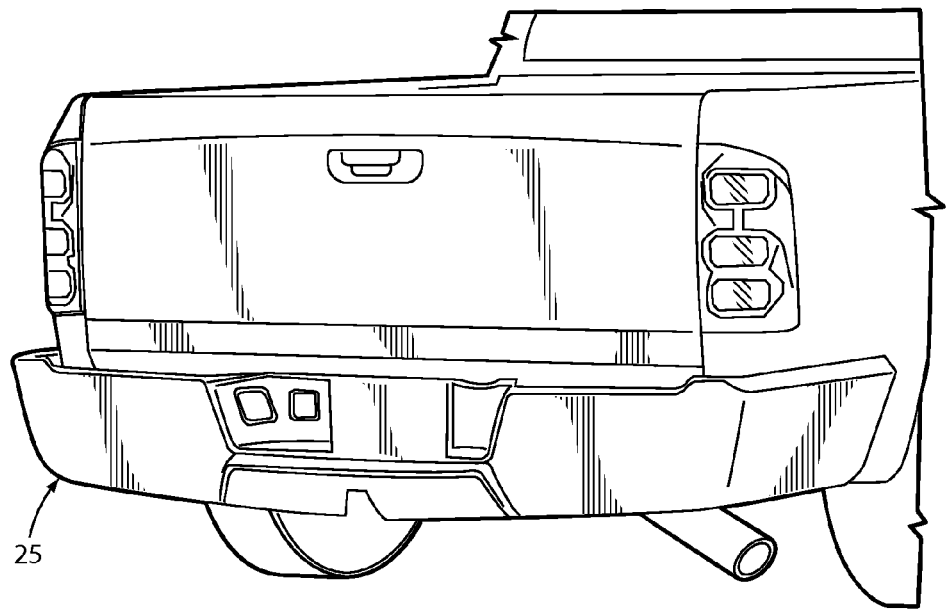
Figure 4:
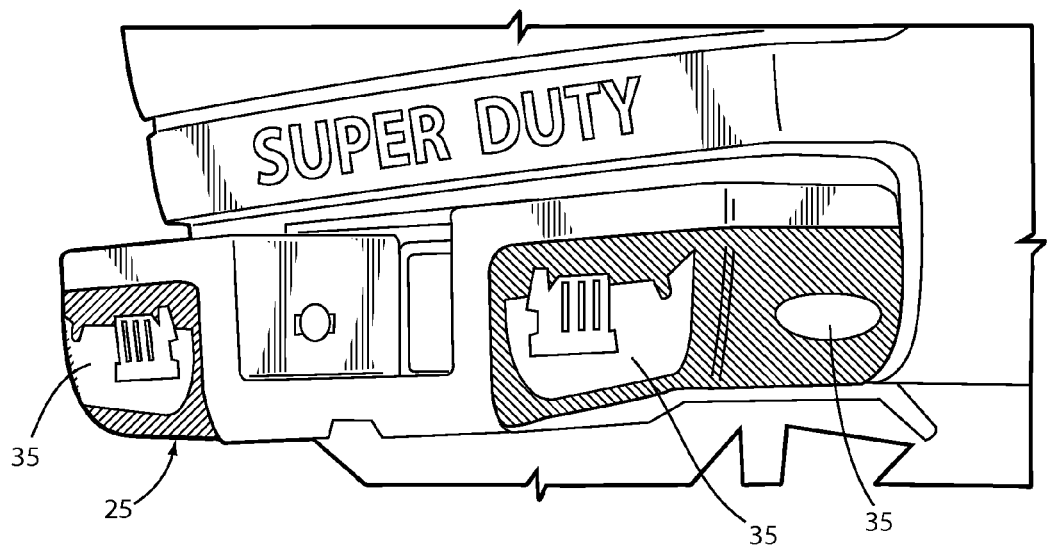

The bumper system 25 is intended to illustrate a variety of existing prior art bumper systems, and it will be apparent to persons skilled in this art that the present innovation is not believed to be limited to only being used with the specifically illustrated bumper system nor the specifically illustrated bumper components shown. For example, FIGS. 2-4 show various truck rear ends incorporating a bumper system (25) not unlike that shown in FIG. 1. My investigation shows that the edges 31A-33A and also the edges 31B-33B usually have (or often have) an unfastened edge or free/unattached outer edge portion. Sometimes, stickers or adheringly attached thin-sheet coverings 35 (FIG. 4) are used on exposed portions of the beam 30. Persons skilled in art of vehicle bumper systems will understand that the bumper system 25 is sufficient to exemplify a large number of such existing bumper systems, and that the present concept is not limited to only being used with the specific illustrated bumper system 25.

Because of the high cost of tooling the stamped bumpers, OEMs (original equipment manufacturers, such as automotive companies that assemble and sell vehicles) do "styling refreshments" as a truck model ages. Sometimes, the styling refreshments are done because consumers are giving the vehicles poor marks. However, the styling refreshments do not usually include the bumpers, because of high cost. In addition, the fact that the bumper shape/style is directly linked to the impact and structural integrity of the bumper system is also a deterrent to providing many options or model "freshening" due to the additional engineering and validation costs. Specifically, any structural change to a bumper system may require validation testing, which is expensive, time consuming, and a significant event that adds time delays and high cost to bringing new/refreshed models to market.

In contrast, it is noted that the bumpers used on most uni-body passenger vehicles are typically constructed of a very stiff and strong tubular reinforcement or impact bar made from UHSS or Aluminum. A plastic or foam isolator or energy absorber is typically used on the face of the impact bar to absorb low speed impacts and prevent permanent damage. These bumper systems are completely covered by a mostly decorative fascia or cover molded from a flexible/elastomeric material, such as TPO (thermoplastic olefin) or RRIM (reinforced reaction injection molded part) so as to be resilient to low speed impacts. These decorative fascias can be sculpted by designers independent of the impact bar shape to enhance the styling and aerodynamics of the vehicle and have negligible influence on impact performance. Therefore, when it comes time to refresh or differentiate the look of the vehicle, these fascias are usually one of the first things changed . . . because of the significant effect on the style of the vehicle, the relatively low cost of re-tooling, and the minimal re-engineering or validation (since the bumper beam under the fascia can remain the same).

Current options available to truck owners that would like to restyle/customize the look of their truck bumper and/or add protection are usually either by: 1) Replacing the entire bumper with an aftermarket bumper (see FIG. 2—showing a typical aftermarket rear truck bumper), or 2) Covering the entire bumper with a large molded plastic fascia that would typically require additional painting at a body shop (see FIG. 3—showing a typical aftermarket rear truck bumper cover), or 3) Through applying a decorative film (car wrap) directly on to the surface of the steel bumper (see FIG. 4—showing a truck bumper with directly applied decorative film). Each of these alternatives has certain limitations that the current invention is designed to overcome. For instance, replacing the current OEM bumper with an aftermarket bumper is expensive and may not meet the same functional performance of the OEM bumper. The aftermarket molded fascias are also expensive, especially with the addition of paint costs, are typically not very durable, and may not fit well. The decorative films cannot change the geometric styling of the bumper, do not add significant protection for the bumper or cover existing damage, and cannot be taken off and re-used. They are also difficult to install, thus typically requiring a professional installer at additional expense. Thus, known bumper covering systems do not satisfy several known limitations and/or problems associated with existing bumpers, nor worn/damaged bumpers as noted above.

DETAILED DESCRIPTION OF PREFERRED EMBODIMENTS

A bumper shell 50 (also sometimes called a "skin" or "shell covering" or "shell component" herein) is a molded plastic piece of semi-rigid resilient-but-stiff component designed to form fit over (or "glove onto") the exposed outer steel surface of a truck bumper. The shells 50 at right and left ends of the bumper are mirror images of each other, such that a description of shells 50 in FIGS. 5-6B, 7, 9A-9D, 11, 12A-12B, 12D, 13 and 15 are sufficient for an understanding by persons skilled in this art. The illustrated shell 50 is typically 1.5 to 3 mm thick (or more preferably about 2 mm thick), and molded from a transparent material such as PET-G, Acrylic, or Polycarbonate (see FIG. 5). It can be any shape or style needed to cover a bumper beam, in terms of height, length, L-shape, and concavity, and may have (as many) attachment tabs or edge flanges as needed. The shell 50 can be made from an opaque material if a light-passing section is not required and volumes are sufficient to support the use of different materials, as discussed below.

The illustrated shell 50 is a vacuum-formed thin-walled form-fit removable decorative component, referred to as a "shell" herein due to is self-supporting resilient-but-relatively-rigid shape. The shell 50 includes a front vertical wall portion 51, a wrapped-end portion 52, and a reversely-formed lower flange 53 extending under portions 51-52. Its upper edge 54 and inboard edge 55 include outwardly-extending integrally-formed attachment flanges 56 and/or long attachment tabs 57 shaped to tuck under the free edges 31A-33A, 31B-33B discussed above (FIG. 1). The flanges 56/tabs 57 preferably are positioned on enough edges of the shell 50 to secure the shell 50 to a beam 30. It is noted that the wrapped-end portion 52 and/or the lower flange 53 may be additionally attached via double sided tape or clips.

The shell 50 has a concavely-shaped inner surface 58 that mateably engages and generally matches a curved show surface of the associated existing bumper beam (30). It is noted that vacuum-forming processes and tooling are particularly adapted to manufacture shells 50 patterned after the existing bumper beam 30 at low cost, even with low volume production runs. The shell 50 further includes an aesthetically treated outer surface 59 that aesthetically covers the underlying curved show surface of the beam 30. The attachments 56-57 are adapted to attach the shell 50 to the existing vehicle bumper beam 30 via the flanges 56/tabs 57 tucking under the free edge of the existing trim accessories 31-33. As noted above, additional attachments can be used if necessary to securely hold the shell(s) 50 on the beam (30), such as mechanical or adhesion based attachments.

Figure 5:
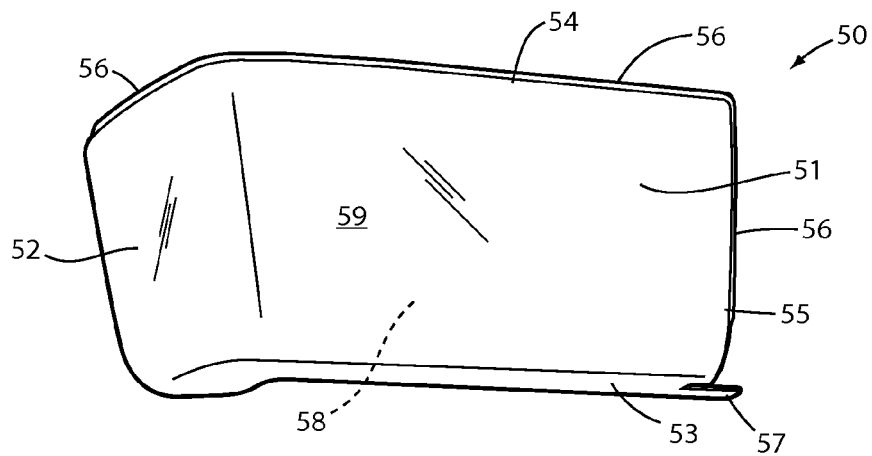
FIG. 5 is a perspective view of a shell for covering an end of a bumper beam, the shell embodying the present invention.
Figure 6A:
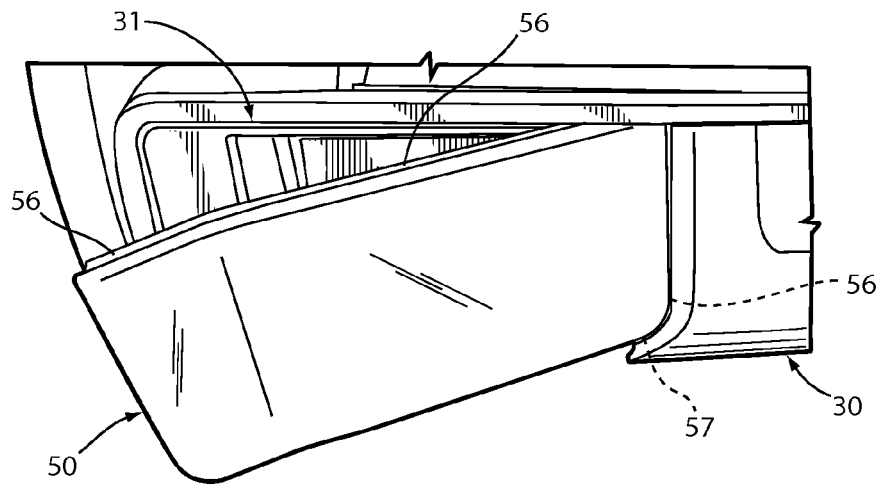
Figure 6B:
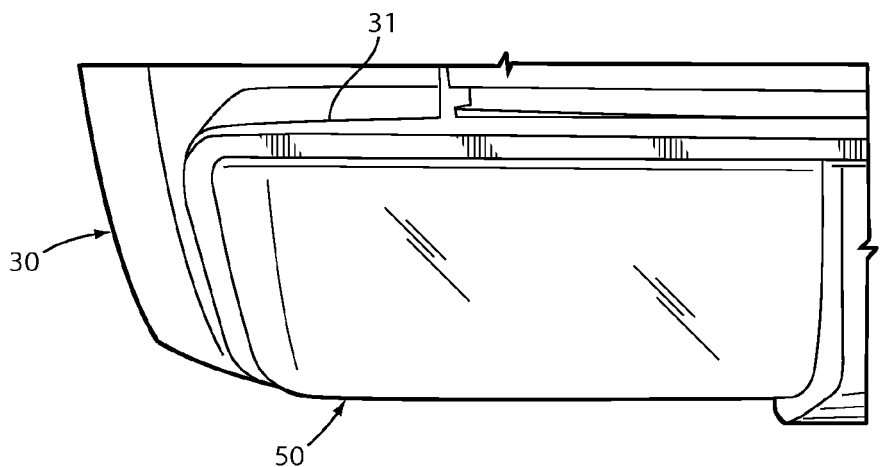

FIG. 5 illustrates one such molded plastic transparent bumper shell. However, as noted above, other thicknesses and materials can be used. Nonetheless, it is noted that thin parts such as these bumper shells with large projected surface area are difficult to mold via injection molding, and further it is noted that injection molding requires expensive tooling. For that reason, vacuum forming is my preferred method for forming these thin shells (including the shell in FIG. 5), especially when considering there may be multiple different models and some lower volume runs. Nevertheless, it is contemplated that a scope of the present innovation includes various molding technologies (including injection molding, transfer molding, compression molding and blow molding) as a forming option, particularly when volumes are high enough to justify the cost of capital. It is noted that non-clear materials can be used to manufacture shells when no backlighting is applied. However, making all of the shells 50 out of clear material is currently an attractive option, since it maximizes commonality and minimizes inventory.

Rather than one large piece that covers the entire bumper like current aftermarket fascia products, which also would require very large tools and molding presses, the present bumper shell innovation includes combining multiple shells 50, 50C to cover a bumper beam (see FIG. 6E) by preferably dividing the task into two or more pieces, and further they only cover the exposed metal portions of bumpers (and do not cover the existing plastic trim). Specifically, FIG. 6E illustrates a three-piece shell covering including beam-end-covering shells 50 and center shell 50C. The center shell 50C is not unlike shells 50 (FIG. 5) but instead includes flanges and tabs shaped to engage the free edge of the center bumper step under the license plate area, and to engage adjacent edges of the end-covering shells 50. By splitting the system into 3 shells 50 and 50C, this helps keep tooling cost down, which is very important for aftermarket products. In addition, it helps maintain the functions of the existing plastic trim and some continuity of style with the rest of the truck. It also allows for more precise gap/fit adjustments to match the surrounding truck features than other one piece solutions (aftermarket bumpers and fascia).

Multi-piece shell coverings of the present invention provide additional advantages. By being separated into separate pieces, the material is also allowed to move during expansion and contraction due to temperature changes without distortion (which can be a problem on current full length fascia alternatives). Also, the multi-piece designs present a "natural aesthetic" for many truck bumper designs, because the OEM's (original equipment manufacturer's) style applies a plastic trim through the middle of the bumper, making a natural left and right half. Notably, some existing bumpers have a chromed or painted steel bumper beam that is continuous from left to right, so there is no natural break. (See FIG. 2.) However, in these cases, a left and right bumper shell can be formed with a third piece/shell bridging between the two. (See FIG. 6E.) This third piece (i.e. the center shell) can either have the same look (texture/pattern/color) as the left and right shells, or it can be intentionally made different, such as a black intermediate shell/trim piece, depending on the desired style. This middle piece would normally be in the towing area, which is normally the most susceptible area for damage to the bumper, such as from hitching a trailer. Therefore, this third/middle piece can be constructed of a thicker and more elastomeric/impact resistant material, such as TPO, to minimize damage to the bumper. The intersecting edges of the center piece and the side pieces are offset to reduce the visibility of the joint as shown below, with the center piece always on top to retain the side pieces against the bumper. The center piece is typically attached to the bumper with magnetic or double-sided tape.

Intersection joint design between a bumper shell and existing trim: A unique feature of the present bumper shell 50 (and 50C) is the offset perimeter flanges 56 and tabs 57, (like those shown in FIGS. 5 and 6A-6D), which are formed in the bumper shell so they can be tucked under the existing plastic trim pieces of the bumper and thereby provide the main attachment function and to completely hide most edges, creating a very high quality look. Since the shell components have significant structural strength, the perimeter flanges and any attachment tabs extending therefrom are sufficient to securely retain the present bumper shell components in place.

FIG. 6 illustrates a bumper shell 50 installed with flanges/tabs 56/57 tucked under existing plastic trim. By keeping the shell thin (such as about 2 mm), it is relatively easy to tuck the flanges between the bumper and the existing trim pieces with minimal distortion of the trim and minimal effect on the re-installation effort of the trim piece. Any remaining free edges (such as along a lower edge or outer vertical edge on the wrapped portion) can be attached with re-useable methods, such as magnetic tape or clips, if necessary. For more permanent installation, other means, such as double sided tape may also be used. Therefore, the bumper shell is not only easy to apply in a matter of minutes, but it can also be removed and re-applied if desired for changing the look of the truck. This is not possible with current alternatives.

In order to create a "solid feel" and "dampened sound" rather than a hollow "plasticky" sound and feel inherent with plastic covers, the back side of the present bumper shell's inner surface 58 is coated with a soft elastomer layer 62, such as polyurethane (TPU) or Latex. The soft coating can be relatively smooth or "ribbed" (see FIGS. 9E, 12C, 12E), depending on the amount of gap to be filled. This coating creates a soft interface that dampens sound, overcomes minor surface differences, and provides a direct load path to create a solid/supported feel that the customer will consider higher quality. This soft elastomer is typically applied with a coarse paint brush or flexible applicator.

A preferred method is to form a ribbed pattern in the coating layer's (62) bumper-engaging interface by wiping it with a flexible squeegee that has a ribbed/toothed edge when the coating has just cured enough to begin to maintain some shape. When the completed bumper shell is applied to the bumper, the thin raised ribs bend over/compress where the shell first comes in contact with the bumper, thus more able to adjust for gap variation. The special coating formulation is developed such that when dry, the coating surface remains slightly "tacky", such that when the bumper shell is applied to the bumper, it will "cling" to it. The additional and novel "clinging" affect provided by the soft coating greatly aids in securing the bumper shell to the entire bumper surface. However, as contrasted by an adhesive that is more permanent, the soft coating allows the shell 50,50C to be repositioned and/or removed. This elastomeric lining/interface also provides the electro-luminescent panel light source (described in next section) additional protection from moisture and abrasion. Raised/projected areas 60 (FIG. 7) can also be formed in the bumper shell components and filled with the elastomeric material in order to create an in molded "bumperet", providing additional low speed impact protection for the truck. (See FIG. 7, which shows a bumper shell with outwardly "projected" area for added styling effect and filled internally for increased impact resistance.)

Figure 8A:
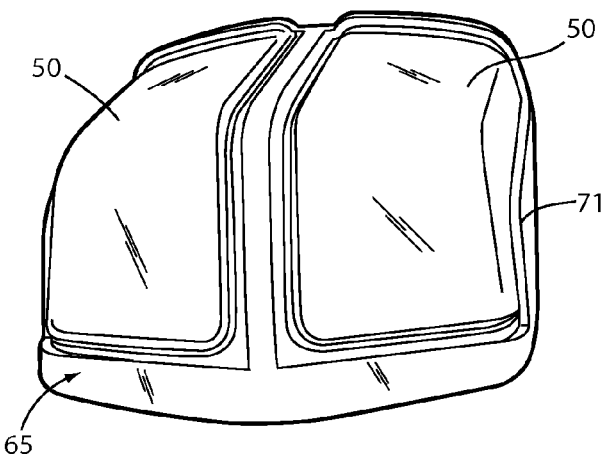
FIGS. 8A-8B are perspective views of an as-formed vacuum-molded component that includes the end shell of FIG. 5 and that includes a raised ridge forming a guide for a cutting tool, such as a router shown in FIG. 8B.

In addition, when the manufacturing method is vacuum forming, a new technique has been developed to eliminate the need for additional trim fixtures, set up fees, and high charge rates for CNC trimming operations generally required for trimming out vacuum formed parts. Thus, this novel concept saves significant capital and piece cost expense. It comprises machining a raised area, or shoulder, into the tool around the perimeter of the part to be vacuum-formed. A blank flat sheet is heated to a desired softened temperature suitable for vacuum forming by drawing by vacuum the blank down onto the surface of the machined tool 70. See FIGS. 8A-8C, with FIG. 8B showing a vacuum-formed part 65 on a vacuum form tool 70, the vacuum-formed part 65 having a raised perimeter 71 (also called "shoulder" or "integral raised guide") around each of the two shells 50 formed.

Figure 8B:
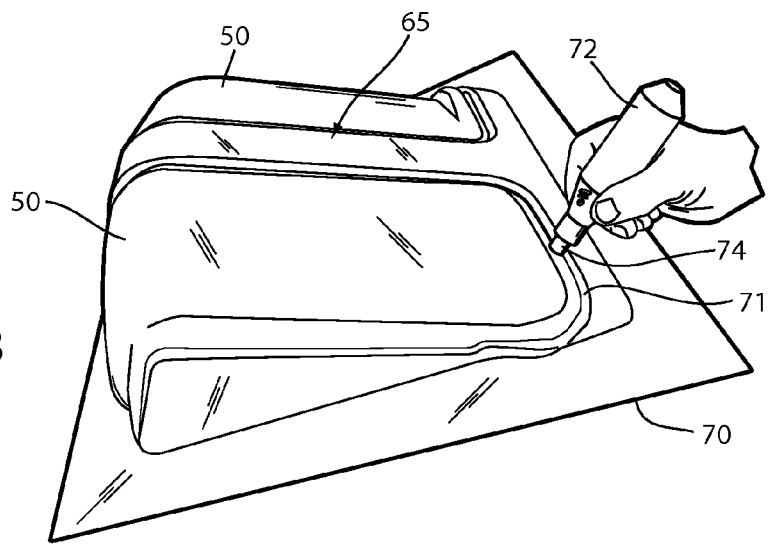
Figure 8C:
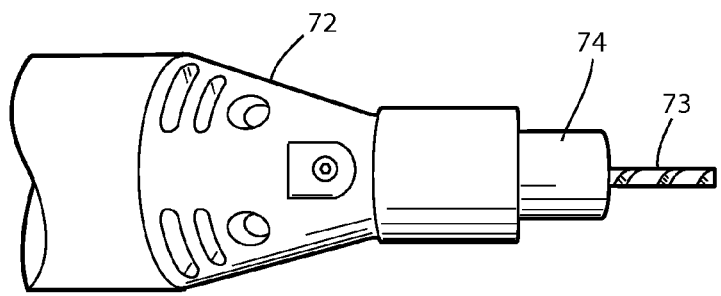
FIG. 8C is a side view of the router in FIG. 8B, and FIGS. 8D and 8E are top and side schematic views showing engagement of a router guide with the guiding ridge on the vacuum-molded component of FIGS. 8A-8B and also showing a relative position of the router's cutter.
Figure 8D:
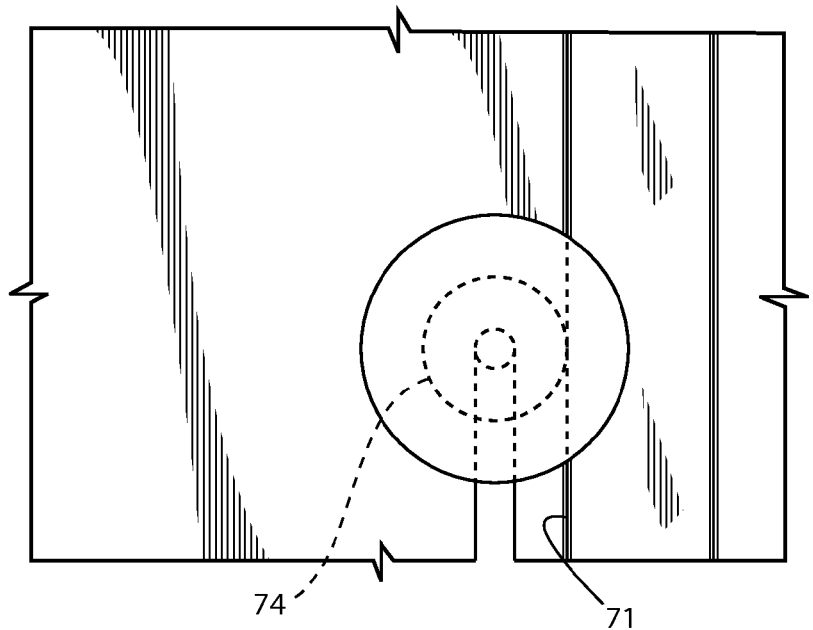
Figure 8E:
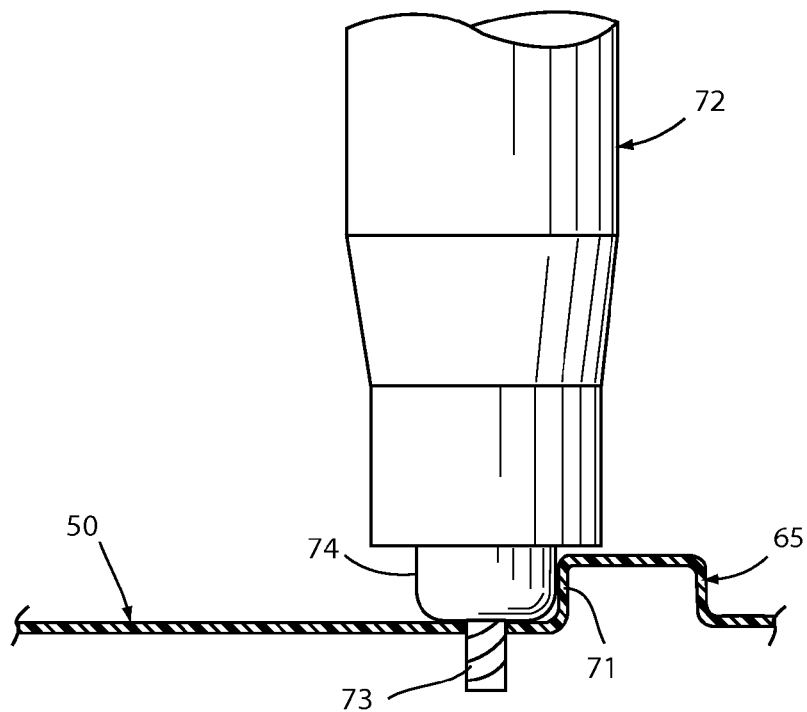

By way of example, as shown in FIGS. 8B, 8D-8E, the raised perimeter 71 acts as a tool guide for guiding around the part (50) a manually-operated cutting tool such as a Dremel® router 72 with a rotating cutter/bit 73 and router-attached ridge-engaging guide. In FIG. 8D, a bottom of the router is illustrated by the large diameter, the router guide is illustrated by the intermediate circle, and the router cutter is illustrated by the smaller diameter. The material cutaway by the router cutter is illustrated by two parallel router-cut lines extending from the cutter downward in FIG. 8D, with the left line illustrating an edge of the shell 50 cut out by this technique. For my prototype, the raised perimeter 71 was 0.4-0.5" tall, the router cutter was a ⅛" bit, and the illustrated bit collar/guide was 0.665" diameter. The resulting cut line along an edge of the part was 0.395" inboard from the raised perimeter 71. It is noted that the raised perimeters 71 can include undulations for forming the particular perimeter desired on the shell 50, including for example protruding "bumps" to form the tab 57 or form clearance areas for fasteners on the existing bumper that the shell must fit around. Persons skilled in this art will thus understand the many significant advantages using the technique set forth above.

It is noted that a variety of different guides or ridge-followers can be used and still be within a scope of the present invention. The illustrated special guide is a cylindrical bushing or follower used on the rotating cutting tool or router. It is unusual since it is positioned to engage a raised ridge located above the cutter (as opposed to known routers where a guide is below the router cutter). The illustrated router guide is shaped to be maintained in contact with this raised perimeter shoulder 71 during the trimming operation. The illustrated guide bushing is fabricated with a specific diameter such that the cut for the bumper shell edge is always a specific/constant distance from the raised perimeter guide. The cutting bit is extended through a hole in the center of the guide, and the guide is attached securely to the rotating cutting tool/router. The trim operation should always occur in a clockwise direction around the part, so the direction of blade rotation helps keep the guide bushing against the shoulder, thus minimizing any tendency for the blade to wander away from its intended position.

With this method, the need for an additional vacuum fixture is eliminated as is the need for expensive CNC routing of the part, saving a substantial amount of money, especially for lower run quantities. The trim guide is trimmed off with the rest of the blank and sent to a recycler. For larger run quantities, CNC routing is advised for trimming out the part. For even higher volumes, when injection molding is used, the part does not require trimming.

It is contemplated that the outer surface 59 of the present innovative shells 50 may be decorated in many different ways with an outer surface covering 63 (FIG. 9E) and as illustrated by FIGS. 9A-9E, and by using several different methods, such as: A) wrapped with a pre-printed adhesive backed vinyl 63 (FIG. 9E) such as used for decorative vehicle wraps after forming, B) formed using either a material with a pre-printed or laminated pattern/color, C) in-mold decorated by inserting a printed film or panel in an injection mold and injecting the shell material on the back surface of the film, D) using the hydrographic process of dipping the formed part into a vat of water where the graphic image to be transferred is floated on the surface.

A preferred and novel method for low volume applications where a backlit image/logo is desired on the bumper shell is the wrapped vinyl method on a shell 50 made using a clear bumper shell material. The window area where the backlighting is desired can either be pre-cut into the film before application to the shell and held in place with transfer tape until application, or cut out of the film after application and removed from the film in the region to be backlit when the design shapes are simple, such as circular or rectangular.

Images/logos for backlighting can be achieved using several methods. For example, they can be made by printing (or other indicia 66, see FIG. 11) on translucent colored vinyl and applied to the exposed surface of the bumper shell over the cut out region (i.e. in a "window" area 67). (See FIG. 11.) Typically, the image sticker is oversized such that there is approximately ⅛ inch of overlap with the cut out area to allow for placement variation and potential material shrinkage differences. Alternatively, the image may also be reverse printed and applied to the inside surface of the bumper shell, so as to expose the printed image through the transparent/clear bumper shell where the decorative film has been trimmed away. Some images are created by the cut out shape in the vinyl with a colored translucent film applied on the backside of the shell. Still other possibilities include a standard window shape cut from the vinyl and covered by a colored translucent vinyl 63A (FIG. 12E) either on outside (with prescribed overlap, see FIG. 12E) or on the backside surface of the bumper shell so as to cover the cut out vinyl region. Available commercial or custom stickers (translucent or not, see for example the "bowtie" Chevy symbol in FIG. 12D) purchased separately from licensed vendors by the end user can then be placed over the window area by the customer, thus allowing complete freedom of image choice without the need for individual licensing.

The image area (i.e. window 67) can be then backlit via several available methods, including electro-luminescent (EL) panel/tape 68 (FIG. 12C or 12E) or LED lighting, which have proven to be particularly effective while maintaining a minimal total cross sectional thickness. In particular, a preferred method for areas directly and closely covering the hard bumper surface is with ultra-thin EL panel technology. These panels are approximately the thickness of a credit card, so they can be sandwiched between the bumper shell and surface of the bumper behind the image to be backlit without the need to modify the bumper or distort the shape of the shell. They are typically held in place with tape, although other bonding measures can be used. Also, since they are flat, relatively flexible, and do not utilize a bulb, they can flex to the typical gentle curvatures of a bumper and withstand minor impacts without damage. However, they are susceptible to damage from moisture, so the elastomeric coating, which is applied to the back side of the bumper shell after the EL panel is installed, helps to seal out moisture and protect the panel from damage.

From the basic new concepts noted above, there are at least four major advancements from current available options for truck bumpers. These include 1) providing a form fit removable decorative shell over a stamped bumper (including retrofittable attachment), 2) providing a carrier/lens for adding lighted effects, 3) providing protection against rock impingement, small "dings", and rust, (as well as a method of retrofittably covering same without large expense), and 4) providing a relatively inexpensive repair to an already damaged bumper.

More specifically in regard to the subject of providing a form fit removable decorative shell over a stamped bumper, the truck bumper shells of the present invention will allow the truck owner to overcome the styling constraints on the stamped steel bumpers and limitations of alternative solutions by changing the surface appearance (texture, pattern, color, and shape) of the exposed steel portions through the application of decorative films, customized paint, molded-in colorants/patterns, printed patterns, or mold-behind graphics on to the thin (~2 mm) plastic bumper shell. As explained, the bumper shells can be molded to exactly match the contours of the existing bumper. However, additional geometric styling freedom is possible through localized geometric changes to the molding while still being supported by the steel structure of the bumper and not degrading its impact performance as per the basic concept. A novel concept has been developed for attaching the shell to the bumper by tucking the flanges under the existing trim pieces and coating the backside of the bumper shell with a soft and tacky coating, such that it "clings" to the bumper surface. Through these means, no modification of the bumper nor additional mechanical fasteners or adhesives are typically required. The bumper shells can be easily applied, removed, and re-applied without damage, thus maintaining a pristine bumper underneath.

Figure 9A:
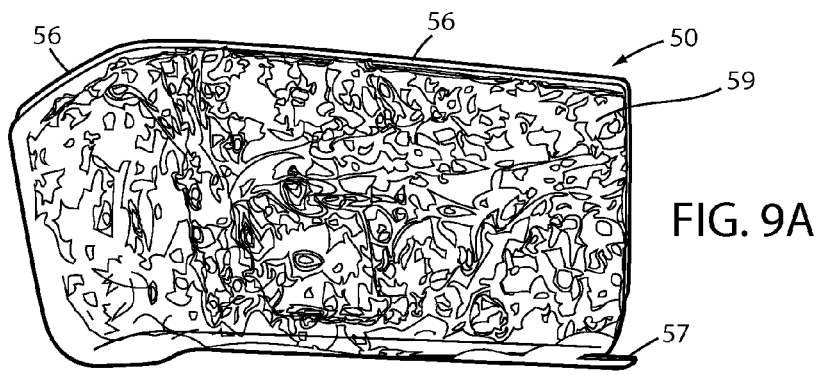
FIGS. 9A-9D are shell coverings like that shown in FIG. 5, but with different surface treatments.
Figure 9B:
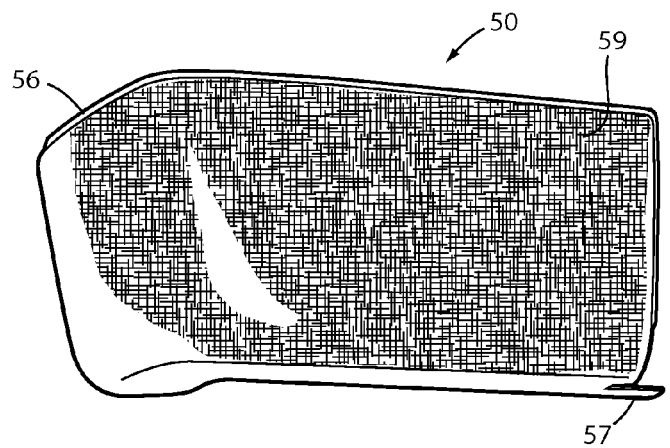
Figure 9C:
Figure 9D:
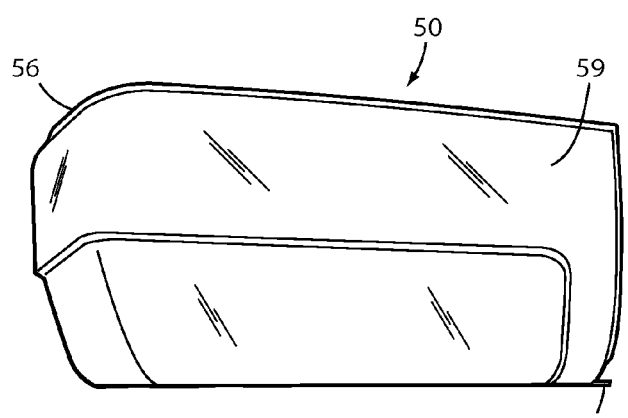
Figure 9E:
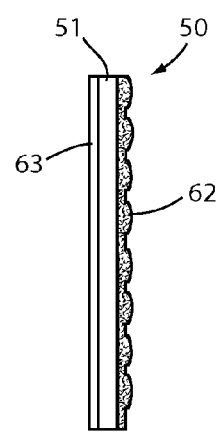
FIG. 9E is a cross section through FIG. 9A showing different layers including a soft/tacky layer of polyurethane for energy absorption and adhesion to underlying metal bumper surface being covered.

Examples of the decorative opportunities for restyling the truck are shown in FIGS. 9A-9D. FIG. 9E illustrates one laminar arrangement forming the shell 50. In FIG. 9E, the decorative layer is the left outer layer, while the intermediate middle layer is a transparent polymeric shell, and the innermost layer on the right side is a layer of soft/tacky material that adheringly clings to the metal bumper beam's surface. The tacky material both fills minor bumps and defects in the bumper beam's surface, and also absorbs small shocks and impacts directed against the shell 50 by road stones and the like. It is contemplated that the soft/tacky material can be applied with a trowel to form a plurality of parallel ridges that assist in filling in surface defects and in forming an impact-absorbing structure on the bumper beam.

Figure 10:
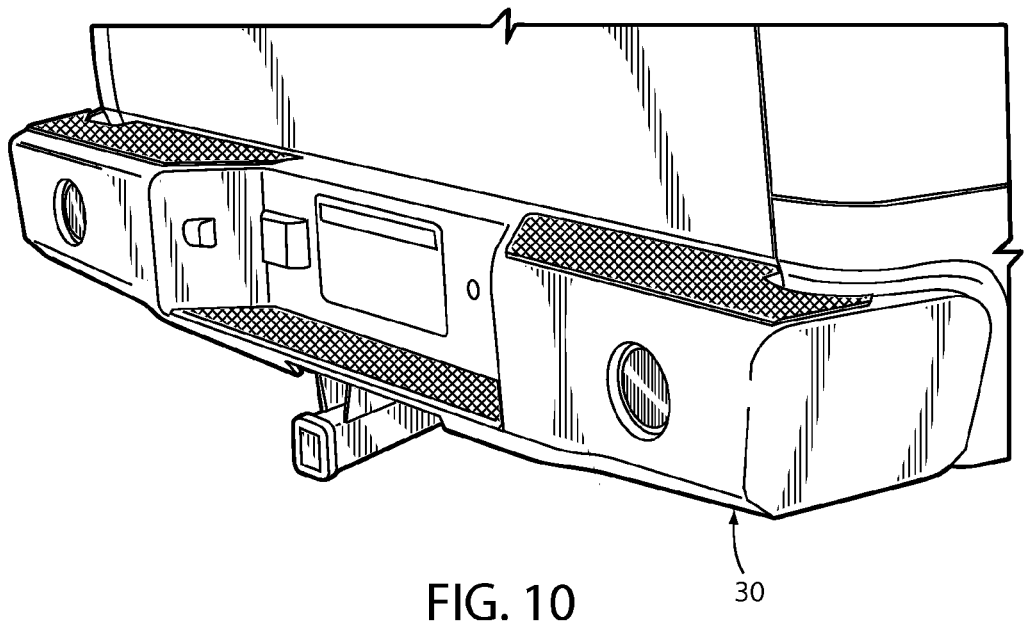
FIG. 10 is a perspective view of an existing truck bumper system in prior art.
Figure 11:
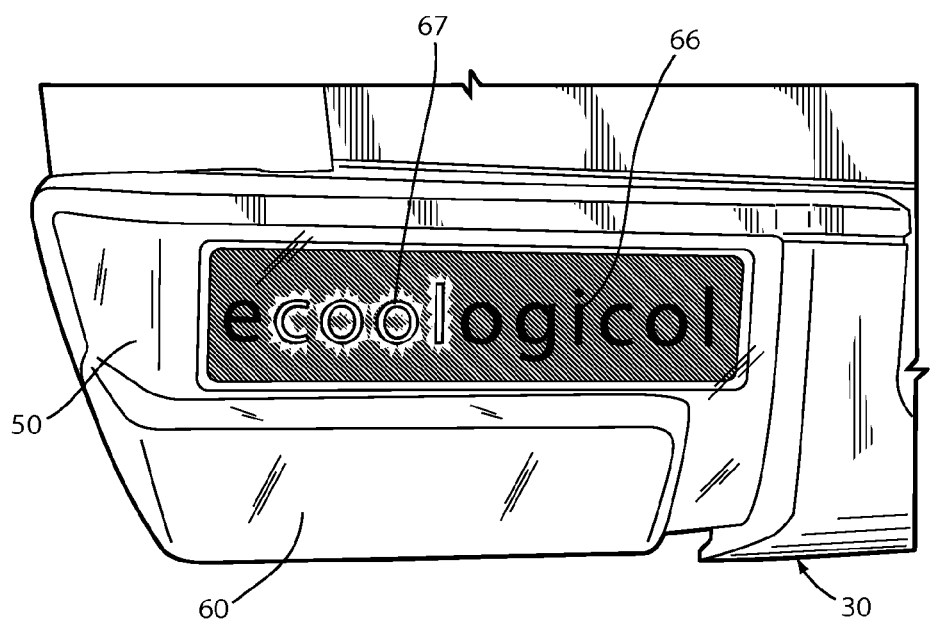

In regard to providing a carrier/lens for adding lighted effects, the truck bumper shells can be molded from a transparent polymeric material, such as PET-G, Acrylic, or Polycarbonate using either the vacuum forming or injection molding process to give the shell its shape and thickness. See FIGS. 12A-12B and the related cross section FIG. 12C, and also see FIG. 12D and the related cross section FIG. 12E. Since the bumper shell is mainly designed to fit snuggly over the existing bumper, it is significant that a durable lighting technology has been identified that is thin enough to be "sandwiched" between the bumper shell and the rigid steel bumper surface without distorting the plastic shell or requiring modification of the steel bumper. Existing known bumper lighting technologies typically use either incandescent bulbs or LEDs (see FIG. 10). Because of the depth requirement of each of these technologies (i.e. FIG. 10), they each either require a raised/projected surface to be placed behind or for a depression or hole to be made on the bumper.

Figure 12A:
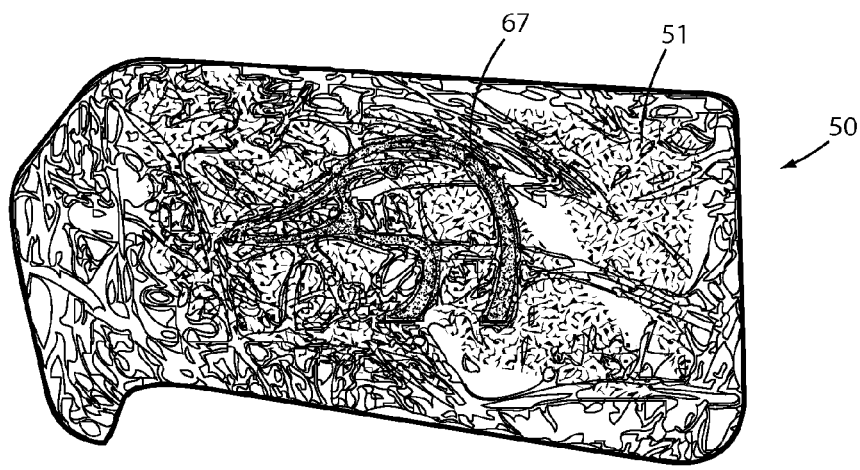
Figure 12B:
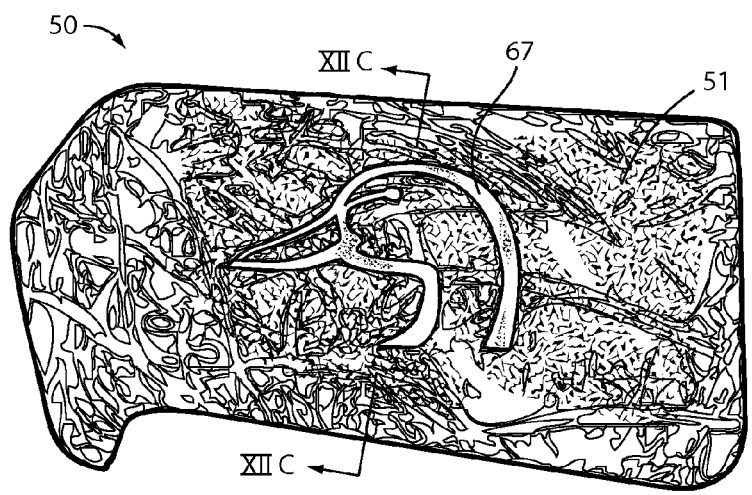
Figure 12C:
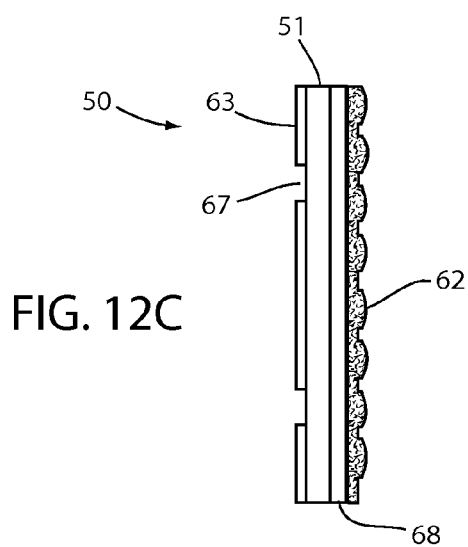

Contrastingly, the present invention applies a technology called electro-luminescence (see FIGS. 12C and 12E), which is essentially creating light by applying a charge (current) with electrodes to a film constructed of light emitting phosphor materials and laminated with a protective film. These electro luminescent (EL) films come in the form of thin tapes or panels that are typically only 0.02 inch thick. The EL panels are flexible enough to form around gentle 3D contours, such as those found in typical stamped truck bumper surfaces (which cannot be accomplished without great effort with the alternative technologies). By selecting particular colors and lighting arrangements, words or phrases can be made to stand out, especially when viewed at dusk or night. See FIG. 11 where the word "COOL" is luminated and made to stand out from the word "ECOOLOGICIAL". Also, see FIGS. 12A-12B, where a duck head profile is made to stand out when lit (FIG. 12B). FIG. 12C illustrates the arrangement of layers, with the outermost layer on the left providing background printed indicia, a first intermediate layer (next to the outermost layer) being a transparent shell material, a second intermediate layer (to the right of the other intermediate layer) being the EL tape/film, and the right innermost layer being the soft/tacky layer discussed above. FIG. 12D illustrates the opening defining a "bowtie" Chevy symbol (trademark of General Motors), with the outmost layer having a center area that lights up at a first brightness and a perimeter that is thinner and that lights up with an increased brightness over the center area. It is noted that there are an infinite number of variations that can be done, using a combination of window shapes, translucent films applied over the window, brightly-lit perimeters, and the like. It is conceived that custom sticker's can be printed on and applied to the "flat" areas on the shell, such as the rectangular area illustrated in FIGS. 12D-12E.

Notably, most state highway laws require that rearward facing lights on the vehicle be diffused and under a particular illumination (candle) power. Since the generated light of the EL panel is evenly diffused across the surface of the panel, it does not create "hot spots" of light behind the image to be backlit like a bulb or LED, so they not only meet this requirement, but look even better. Still further, the light-passing window can form a pattern not unlike a rear light (see FIG. 13).

The EL panel noted above is typically adhered to the backside of the bumper shell by taping (or other bonding means) around the perimeter in the area where the backlighting is desired, such as where a printed vinyl film or other semi-transparent image will be placed/created on the bumper shell. The size of the EL panel can be pre-specified from the manufacturer to fit the desired backlit area or trimmed (requiring re-sealing of the cut edges with protective tape) to the desired shape/size.

By using the present approach with EL panel, images of almost any kind, such as company logos, licensed logos from others, words/messages, etc. can be either printed on vinyl film and applied to the outside surface of the bumper shell or airbrushed directly on to the bumper shell, thus making a very impressive backlit mobile advertising space. In most cases the EL panel will have a white light emitted with the color of the image coming from what is used on the vinyl sticker to create the image. However, EL panels that emit colors other than white may also be used. In some states, the colors of light on the rear of the vehicle are limited to red, amber, or white.

The EL panel is charged through a connection to the tail lamp wiring of the vehicle. This can be done in many different ways, depending on the desire of the truck owner. For instance, it can be tied in to the running lamps, so they illuminate when the headlights or parking lights are turned on. They can also be tied in with the blinkers or stop lamps, illuminating when either of those conditions occurs. The wires can be connected by splicing in along the OEM wire harness to the tail lamps or connected to the trailer light receptacle. In each case, a small transformer is required to establish the correct voltage and amperage to the EL panel and to convert the current from DC to AC.

Once the image is applied to the transparent bumper shell, the rest of the bumper shell is either covered with a decorative film, with a cut-out for the image or painted after masking the image. If using decorative film, the cut out for the back-lit image can either be a simple perimeter, such as a square, rectangle, circle, or oval around the image or the cut-out can be CNC printed/cut out of the decorative film to intermingle with the logo, such as the background between letters, etc. In this case, the film is positioned in the printer with specific datum points, the printed vinyl logo/image can be placed in correct position on the backside of the decorative film, and then the film plus logo is applied in correct position according to the datums on the bumper shell. Another method is to apply the logo/image to the shell first, over the backlit region, and then applying the decorative film by first carefully positioning the logo cutout over the logo and smoothing out the film from the center of the logo to the perimeter of the bumper shell. Still another method is to cut out the wrapped film on the bumper shell in the desired shape/size of window, then carefully place the logo image "sticker" over the cut out area with ~⅛" overlap at the edges to account for placement variation and thermal growth effects. FIG. 12A shows an example of a backlit bumper shell not illuminated, and FIG. 12B shows it illuminated.

It is believed that this additional illumination of the rear of the truck can provide additional visible warning to vehicles coming up from behind for increased safety, especially at night or in bad weather conditions.

Although it is feasible to backlight a directly-applied decorative film to the bumper, this is not preferred since a thickness of the panel, and the wire route would visibly distort the film and would not be as well protected from damage.

In another situation, where raised/projected areas of the bumper shell are desired, there is room to add LED lights behind the projected area and backfilled/potted with elastomer (similar to the bumperet) for another lighted look. These lights can be tied in to light at the same or different time as the EL panel, such as for blinkers or additional stop lamps (see FIG. 13).

The present innovation also provides protection against rock impingement, small "dings", and rust. It does so much like protective covers are used on such things as mobile phones and other electronic devices to provide the expensive device additional protection from scratches, impacts, moisture, etc. The illustrated present bumper shells are designed to protect a new bumper to help maintain it in pristine condition. Truck bumpers are very expensive to replace, costing between $500-$1,200 for OEM replacement parts. Steel is especially susceptible to rust and bumpers are subjected to many harsh environments, such as snow, road salt, debris, etc. The chrome or paint covering of the bumper is meant to protect the steel from rusting, but these protective coatings are oftentimes compromised/breached by rock impingement, small impacts, or scratches. When these coatings are breached, rust forms very quickly, not only rapidly degrading the look of the truck, but over time, also compromising the integrity of the bumper itself (see FIG. 14).

The bumper shells, including the soft elastomer interface and some systems including additional raised areas filled with elastomeric material can provide substantial protection against common damaging events such as rock impingement, scratches, and low speed impacts, prolonging the life span of the bumper in its pristine condition. Decorative films directly applied to the bumper provide some protection for very minor impacts, like light rock impingement, but is significantly lower protection than that provided by the bumper shell, due to its thicker substrate and elastomeric interface. In addition, directly applied wrap films cannot cover dents, punctures, or significant rust. Aftermarket bumper fascias provide greater protection than the films, but are often made of materials that are easily damaged themselves, such as fiber glass.

Figure 15:
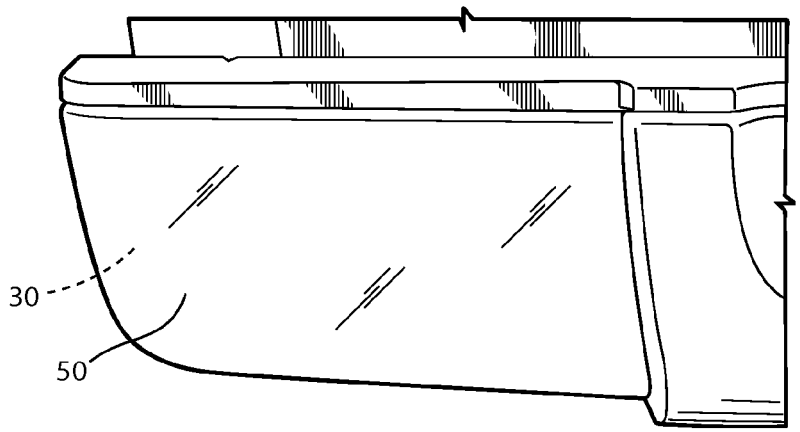
FIG. 15 is a perspective view of a shell of the present innovation installed on the beam of FIGS. 14A-14B.

Since a new bumper is so expensive, in many cases, a damaged truck bumper is never replaced and the truck owner has had to accept the degradation of their trucks appearance. However, much like an old house with peeling paint or damaged exterior can look new again with the application of siding, the bumper shells provide a new decorative outside surface to a bumper that may have already sustained some minor dents, dings, scratches and/or the onset of rust. In addition, in many instances, unless severe structural damage and/or distortion of the bumper has already occurred, more substantial dents can be pounded back to near the original shape. A filler material such as used in the body repair industry can then be used to fill in the remaining depressions and filed/sanded to approximate the original surface. Now, a set of bumper shells can be applied to the damaged bumper in the same manner as explained previously for a new bumper. If the trim pieces have been damaged, they must be replaced. Although, the original surface will never look new again, when installation of the bumper shells is completed, the bumper will have a great new look as shown in FIG. 15.

Figure 14A:
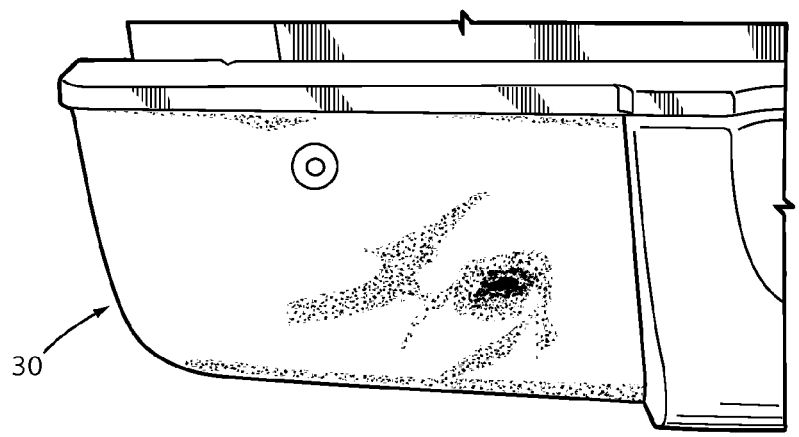
FIGS. 14A-14B are perspective views of a bumper beam in prior art bumper system, where the beam has a rusted out spot (FIG. 14A) and a damaged dented spot (FIG. 14B).
Figure 14B:
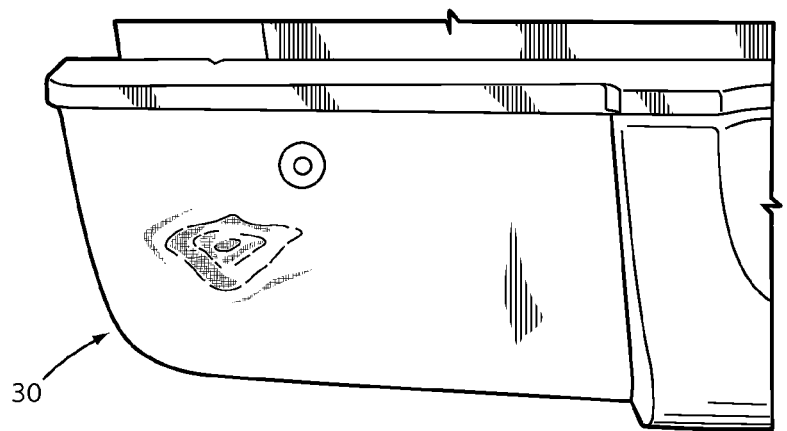

Unlike directly applied decorative film, the bumper shell of the present innovation will cover any remaining imperfections in the repair job and will serve to help protect the repaired bumper from new damage. (See FIGS. 14A and 14B illustrating a damaged bumper beam, and FIG. 15 is illustrating a shell covering the damaged beam.) With this new approach, truck owners will not only save some money and have a new customized look for their truck, but will also reduce the waste and energy associated with the disposal of the old bumper and creation of a new one, including the environmentally damaging chroming process. The application of bumper shells has a much lower environmental impact than full replacement.

Thus, it is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A bumper covering system for covering an existing vehicle bumper beam having a non-planar three-dimensional show surface, comprising:
at least one thin-walled three-dimensional concavely-shaped form-fit decorative shell of thermoplastic material having a thin-wall thickness of less than 3 mm and shaped with an inner surface that mateably engages and generally matches the three-dimensional show surface of the existing vehicle bumper beam, the shell including an aesthetically treated outer surface covering the show surface and an attachment flange configured to engage existing trim on the vehicle bumper beam.

2. The system of claim 1, including a film adhered to the shell with indicia thereon.

3. The system of claim 1, wherein the aesthetically treated outer surface includes a light-passing window and a light source sufficiently thin to fit between the adjacent the light-passing window and the bumper beam.

4. The system of claim 1, wherein the attachment flange includes an integrally-formed flange along an edge of the shell with a thickness of less than about 0.10 inch, thus configured and adapted to tuck under an edge of the existing trim.

5. The system of claim 1, including an additional attachment retaining a free edge of the shell to the bumper beam and that is selected from a group consisting of: clips, magnetic tape, adhesive tape, mechanical fastener and/or soft/tacky material.

6. The system of claim 1, wherein the at least one shell includes first and second end shells and further includes a middle component covering a middle portion of the existing vehicle bumper beam, the middle component having ends engaging a portion of the first and second end shells.

7. The system of claim 1, including a thin layer of elastomer under 20 durometer on the inner surface that provides a soft, anti-abrasion, vibration dampening, and sound deadening interface between the shell and the bumper beam.

8. The system of claim 1, including a sound-deadening interface having a non-uniformly-shaped undulating rear surface taking up small surface imperfections in the bumper beam.

9. The system of claim 1, including a sound deadening interface that is tacky, thus enhancing attachment of the shell to the bumper by clinging to the show surface.

10. The system of claim 1, including the vehicle bumper beam defined in claim 1, wherein the at least one form-fit decorative shell generally matches an original shape of a show surface of the vehicle bumper beam and wherein the decorative shell includes a light-passing portion and a light source behind the light-passing portion for lighting up the light-passing portion.

11. The system of claim 10, wherein the light-passing portion including a light-passing film portion with aesthetic graphics thereon, whereby the light source lights up the light-passing film portion to thus light up the aesthetic graphics.

12. The system of claim 10, wherein the light source comprises one of a light-producing tape and light-producing panel (the light source having a thickness of less than 0.125").

13. The system of claim 10, wherein the shell is made of a light-transmitting material, and the light-passing portion is created by masking an area to be backlit on the shell before treating or coating the shell.

14. The system of claim 10, including an aesthetically treated surface covering on the light-passing portion, and wherein the light-passing portion includes a window created by trimming away an area of the aesthetically treated surface covering.

15. The system of claim 10, wherein a translucent, colored or printed light-passing film is placed on the one of the inner or outer surface of the bumper shell over the light-passing portion.

16. A bumper covering system for covering a vehicle bumper beam having a non-planar three-dimensional show surface, comprising:
at least one thin-walled form-fit decorative shell shaped with an inner surface that mateably engages and generally matches the three-dimensional show surface of the existing vehicle bumper beam, the shell including an aesthetically treated outer surface covering the show surface and an attachment flange configured to engage existing trim on the vehicle bumper beam; and
a raised perimeter tool guide integrally formed with and extending along a perimeter of the decorative shell.

17. The system of claim 16, wherein the raised perimeter tool guide is positioned a predetermined distance outboard from a desired perimeter trim edge of the shell.

18. The system of claim 17, including a cutting tool adapted to engage and move along the raised perimeter tool guide, and having a cutter with cutting edge positioned at the predetermined distance when the cutting tool engages the raised perimeter tool guide.

19. The system of claim 16, wherein the shell has a thickness of less than 3 mm.

20. The system of claim 16, wherein the shell is vacuum formed from a sheet having a constant thickness, the shell having walls with similar thicknesses to the constant thickness but having some thinned stretched sections.

21. The system of claim 16, wherein the shell includes a light-passing window and a light source comprising a light-producing panel.

22. A bumper covering system for covering a vehicle bumper beam having a non-planar three-dimensional show surface, comprising:
- at least one thin-walled three-dimensionally-formed form-fit decorative shell with thickness less than 3 mm, the shell having an inner surface with concave shape that mateably engages and generally matches the three-dimensional show surface of the existing vehicle bumper beam and having a contoured outer surface and further having an attachment flange configured to engage existing trim on the vehicle bumper beam; and
- an outer surface layer with preprinted indicia thereon, the outer surface layer being printed separate from the shell and attached thereto for support.

23. The system of claim 22, wherein the outer surface layer includes a film wrap adhered to the shell.

24. The system of claim 22, wherein the outer surface layer includes a preprinted sheet attached to the shell.

25. The system of claim 22, wherein the shell is vacuum formed from a sheet having a constant thickness of about 3 mm.

26. The system of claim 22, wherein the shell is vacuum formed from a sheet having a constant thickness, the shell having walls with similar thicknesses to the constant thickness but having some thinned stretched wall sections.

* * * * *